June 14, 1927.  
E. V. KING  
1,632,606
PHOTOGRAPHER'S LIGHT DISTRIBUTING MEANS
Filed Oct. 2, 1926
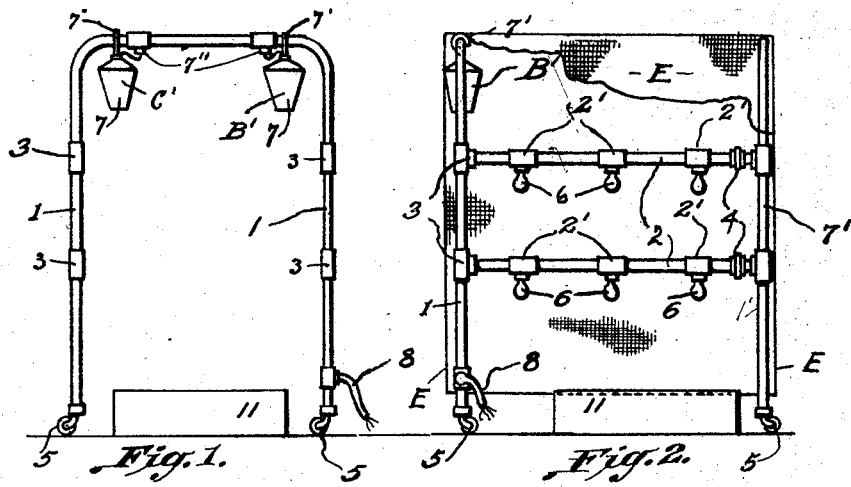
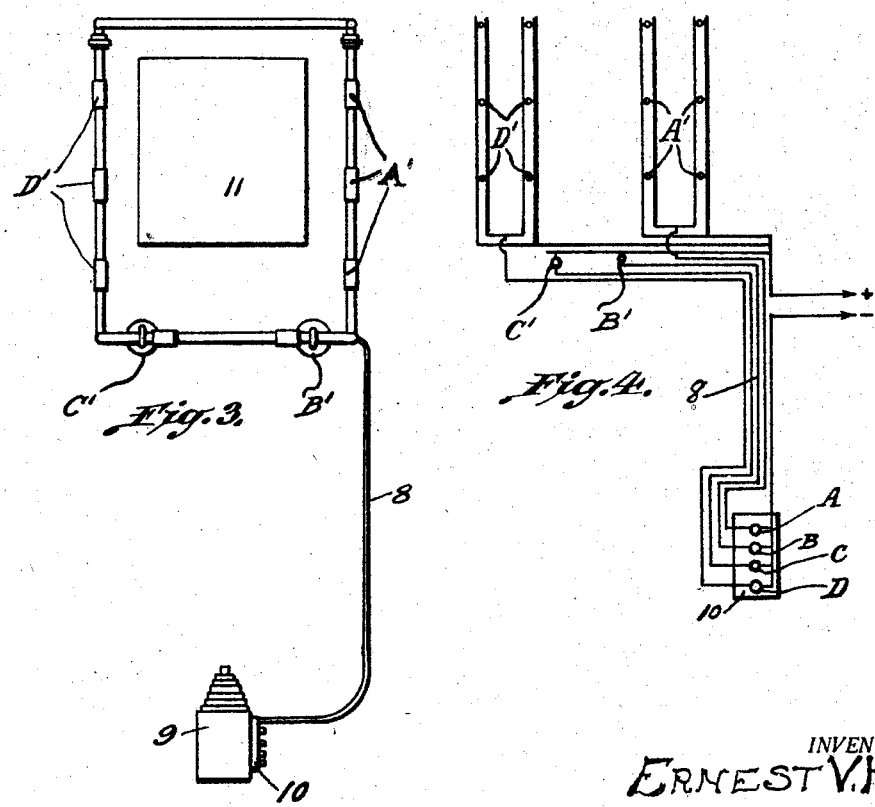
INVENTOR.
ERNEST V. KING
BY
*U. G. Charles*
ATTORNEY.

Patented June 14, 1927.

1,632,606

UNITED STATES PATENT OFFICE.

ERNEST V. KING, OF TOPEKA, KANSAS.

PHOTOGRAPHER'S LIGHT-DISTRIBUTING MEANS.

Application filed October 2, 1926. Serial No. 139,187.

My invention relates to a photographer's light distributing means.

The object of my invention is to provide a lighting system that is portable and inexpensive to construct.

A further object of my invention is to provide an electric lighting system having the wires concealed within the tubing functioning as conduit.

A still further object of my invention is to provide a lighting system that the lamps may be controlled by a switch at the camera turning on the lights in groups at the sides, and individually for the front or top lights.

A still further object of my invention is to provide illumination for the subject being photographed in such a way as to produce proper details on the negative.

A still further object of my invention is to provide a lighting system that will attract and energize the features of the junior or infant subjects.

A still further object of my invention is to provide proper shade of illumination that will intensify the back ground associating the subject.

These and other objects will hereinafter be more fully explained.

Referring to the drawings:

Fig. 1 is a front elevation from the view point of the camera the screen or sheet like member removed.

Fig. 2 is a side elevation and showing the screen or sheet like member applied, a part of which is removed for convenience of illustration.

Fig. 3 is a plan view including the position of the camera the screen or sheet like member removed from the frame.

Fig. 4 is a wiring diagram.

The mechanism herein disclosed consists of a frame having two end members 1 and 1', the said members being arched or curved at the corners as shown in Fig. 1. Transversely and connecting said members are two pair of cross members 2, one pair being on each side thereof. The said members are composed of a plurality of short lengths of pipe connected by standard electric connections 2' having a lamp socket therein, and the said mechanism is rigidly connected to the front member 1 by means of connections 3 threadedly engaging therewith. The opposite ends are attached to the rear end member 1' by means of unions 4 as a convenient means for dissembling the mechanism, and when disconnected the said connecting members will swing in opposite directions with the ends folding on opposite sides of the end member 1 as shown by dotted lines in Fig. 3, this being a convenient means for transportation. The swinging of the members is made possible by reason of the connections threadedly engaging on the frame.

As a means for moving the mechanism I have provided castors 5 which are positioned on the lower ends of the end members. The frame is preferably made of metal conduit, however other malleable piping may be used, the object of which is to draw the wiring through to the various openings where electric lamps are positioned as shown at 6 and 7. The lamps 7 are carried on the top of the frame by rings 7' so that the said lamps may be slid longitudinal thereon to a desired position, the cable connection therefor being flexible conforming to the position of the lamp and connecting with sockets 7". The outlet for the cable 8 is preferably placed at the lower joint of the front end member in close proximity to the castor. From thence the cable will extend to the camera 9 connecting with the switch board 10 where the circuits are controlled, the said cable being armoured by a flexible conduit of some standard make.

Where the wires extend from the connecting members to the end member 1' there will be provided a plug connection therefor as severing means when the end member 1' is removed (the electric connection not being shown). Before assembling, the connection will be made and a surplus wire placed within the tubing after which the unions for the cross member and said end member may be connected.

The control of the lights are as follows; reference being had to the wiring diagram:

Switch A will control the lamps A' simultaneously which is on the right hand side as shown in Fig. 3.

Switch B will control the head lamp B'.

Switch C will control the adjacent head lamp C'.

Switch D will control the lamps D' which are positioned on the left hand side of the frame as shown in Fig. 3.

It is now readily seen how the operator may adjust his light for the best results when photographing the subject.

As a convenient means for posing the subject I have provided a platform 11 which may be covered with such foreground as desired. While I have not shown the background in the drawings it is understood that they will be carried by a suitable frame adjacent the rear end member 1', and the end members being so formed is means for the support of a screen or sheet like member E functioning as a reflector, or a day light retarding means which is not required with the artificial means of illumination.

The drawings show two cross connecting members while in many cases three or more may be desired according to the size of the mechanism which may be to accommodate groups or subjects other than human.

Such modifications in the construction and assembly of the mechanism may be made as lie within the scope of the appended claims.

Having thus described my invention, what I claim as new and desire to secure by Letters Patent is:—

1. In a photographer's light distributing means, the combination of a front end member, and a rear end member, the said members being arched, a plurality of laterally extending members connecting the first said members, all of said members functioning as conduits for electric wiring, a plurality of lamp sockets distributed along the last said members, and lamps engaging therein, lamp sockets in the arch of the front end member, lamps carried by the arch and slidably engaging thereon, a cable connecting the lamps with the last said sockets, a switch board, and a wiring for said lamps, the board being placed in operative position to a camera, all for the purpose described.

2. In a photographer's light distributing means, a pair of arched end members, a screen or sheet like member carried by the arched portion of said end members, a plurality of jointed connecting members for the end members, the last said members connected by lamp socket connections, unions connecting the last said members to one of the said end members as connecting and dissembling means therefor, electric wires drawn through said members to an outlet in one of the end members, a switch board and camera combined, a cable connecting the switch board with the light distributing means, substantially as shown.

3. In a photographer's light distributing means, front and rear end members, the front member being connected at the arch with two lamp socket connections, lamps slidably engaging on the arch of said member, the said lamps being connected with said sockets by cables of sufficient length to allow for the required position of the lamps, connecting members threadedly engaging with the front end member, the opposite ends connected to the rear end member by unions, the said members adapted to swing folded on the front end member by reason of the threaded connecting means thereto, all as and for the purpose described.

ERNEST V. KING.